US012677749B2

(12) United States Patent
Huang et al.

(10) Patent No.: US 12,677,749 B2
(45) Date of Patent: Jul. 14, 2026

(54) PEELING, SCREENING AND CLEANING DEVICE FOR _TORREYA GRANDIS_ 'MERRILLII'S

(71) Applicants: Hubei Minzu University, Enshi (CN); Anqing Yongfa Agriculture and Forestry development Co., LTD, Anqing City (CN); Anhui Agricultural University, Hefei City (CN); Huzhou Vocational & Technical College, Huzhou City (CN)

(72) Inventors: Cheng Huang, Hefei City (CN); Zhaocheng Wang, Huzhou City (CN); Tingguang Han, Anqing City (CN); Hua Liu, Hefei City (CN); Ye Qian, Huzhou City (CN); Zhi Zhu, Huzhou City (CN); Songling Fu, Hefei City (CN); Jingyi Zhu, Huzhou City (CN); Tianhao Huang, Huzhou City (CN)

(73) Assignees: Hubei Minzu University, Enshi (CN); Anqing Yongfa Agriculture and Forestry development Co., LTD, Anqing City (CN); Anhui Agricultural University, Hefei City (CN); Huzhou Vocational & Technical College, Huzhou City (CN)

( * ) Notice: Subject to any disclaimer, the term of this patent is extended or adjusted under 35 U.S.C. 154(b) by 295 days.

(21) Appl. No.: 18/421,482

(22) Filed: Jan. 24, 2024

(65) Prior Publication Data
US 2025/0228163 A1      Jul. 17, 2025

(51) Int. Cl.
_A01F 12/44_ (2006.01)
_A01F 7/06_ (2006.01)
(Continued)

(52) U.S. Cl.
CPC ............ _A01F 12/442_ (2013.01); _A01F 12/18_ (2013.01); _A01F 12/446_ (2013.01); _A01F 12/56_ (2013.01)

(58) Field of Classification Search
CPC ........ A01F 11/04; A01F 12/44; A01F 12/442; A01F 12/446; A01F 12/18; A01F 12/56;
(Continued)

(56) References Cited

U.S. PATENT DOCUMENTS

| 4,621,573 | A | * | 11/1986 | Lange .................. | A23N 12/023 |
| | | | | | 15/3.16 |
| 11,744,185 | B2 | * | 9/2023 | Wilkins ................. | A01F 12/56 |
| | | | | | 460/61 |
| 2018/0110183 | A1 | * | 4/2018 | Soper ..................... | A01F 11/06 |

* cited by examiner

_Primary Examiner_ — Joseph M Rocca
_Assistant Examiner_ — Robert E Pezzuto
(74) _Attorney, Agent, or Firm_ — WPAT, PC

(57) ABSTRACT

A peeling, screening and cleaning device for _Torreya grandis 'Merrillii_'s includes an outer rectangular water container, an inner surface of the outer rectangular water container is fixedly connected with a first antirust horizontal separating net, a second antirust horizontal separating net, and a servo motor; and a bottom inner wall of the outer rectangular water container is fixedly connected with a water pump. An output end of the water pump is fixedly connected with a soft water guide pipe. Thus, the pretreated _Torreya grandis 'Merrillii'_ pericarp is separated through metal wires and a conical table, the time for removing the pericarp is adjusted through electric telescopic rods, and the time for separating the pericarp is controlled. The outer pericarp can be separated through the cooperation of the outer rectangular water container, the water pump and a hard water spray pipe.

5 Claims, 5 Drawing Sheets

(51) Int. Cl.
   *A01F 12/18*       (2006.01)
   *A01F 12/56*       (2006.01)

(58) Field of Classification Search
   CPC .. A01F 7/06; A01F 7/062; A01F 7/065; A01F
            7/067; A23L 2/04; A23N 5/00; A23N
            5/002; A23N 5/08; A23N 7/005; A23N
            7/08; A23N 12/023; A23N 12/005; A23N
            2007/007; B04B 5/12; B04B 5/56
   See application file for complete search history.

PEELING, SCREENING AND CLEANING DEVICE FOR *TORREYA GRANDIS* 'MERRILLII'S

TECHNICAL FIELD

The invention relates to the technical field of peeling, screening and cleaning devices, in particular to a peeling, screening and cleaning device for *Torreya grandis* 'Merrillii's.

BACKGROUND

The peeling, screening and cleaning device for *Torreya grandis* 'Merrillii's is a kind of mechanical equipment specially used to process the *Torreya grandis* 'Merrillii's (also known as *Crateva religiosa* seed or *Populus tomentosa* fruit). *Torreya grandis* 'Merrillii' is a precious nut, which is widely used in the fields of food and medicine. A rotating grinding disc, roller or other friction surface can be used to break the hard shell and separate it from the inner seed 'Merrillii's through physical force. Usually, it is necessary to finely adjust the pressure or friction strength of the peeler to ensure efficient peeling and avoid damaging the inner seed 'Merrillii's. A temperature control system may also be included to optimize the peeling effect. Screening is to separate peeled seeds, broken shells and other impurities through a screen. This is usually achieved by vibrating screen or rotating screen, and the pore size of the screen will be set accurately according to the size of the materials need to be screened. The screening mechanism usually needs to be able to handle a large amount of materials efficiently and can be easily adjusted to adapt to different sizes of *Torreya grandis* 'Merrillii's. The material selection of screen is also very important to prevent corrosion and reduce wear. The cleaning part is used to remove the dust and broken shell residue on the screened *Torreya grandis* 'Merrillii's. This is usually done by water washing or air purging. Water washing can clean seeds more thoroughly, while air purging is used to dry and remove water. The cleaning device needs to consider the effective utilization and saving of water resources, and at the same time ensure that the cleaning process will not cause damage to *Torreya grandis* 'Merrillii's. For air purging, it is usually necessary to adjust the wind speed and temperature to achieve the best drying effect.

However, in the process of using the current device, it is still difficult to peel, and then the finished product is damaged. Therefore, according to the applicant's invention, the peeling, screening and cleaning device for *Torreya grandis* 'Merrillii's is invented, which solves the problem that peeling is difficult and it is easy to cause damage to the finished products.

SUMMARY

(1) Technical Problems to be Solved

In view of the shortcomings of the current technology, the invention provides a peeling, screening and cleaning device for *Torreya grandis* 'Merrillii's, which solves the problem that the finished products are easy to be damaged.

(2) Technical Scheme

In order to achieve the above purposes, the invention is realized through the following technical scheme: a peeling, screening and cleaning device for *Torreya grandis* 'Merrillii's comprises the followings:

An outer rectangular water container, the inner surface of the outer rectangular water container is fixedly connected with the first antirust horizontal separating net, the inner surface of the outer rectangular water container is fixedly connected with the second antirust horizontal separating net, and the bottom inner wall of the outer rectangular water container is fixedly connected with a water pump; the output end of the water pump is fixedly connected with a soft water guide pipe, the inner surface of the outer rectangular water container is fixedly connected with a servo motor, the output end of the servo motor is fixedly connected with a hard water spray pipe, and the upper surface of the hard water spray pipe is provided with a water spray round hole;

the inner surface of the outer rectangular water container is fixedly connected with the second antirust metal transverse supporting rod, and the inner surface of the outer rectangular water container is fixedly connected with the first antirust metal transverse supporting rod; one end of the first antirust metal transverse supporting rod far away from the outer rectangular water container is fixedly connected with a motor: one end of the second antirust metal transverse supporting rod far from the outer rectangular water container is fixedly connected with a cleaning box the inner surface of the outer rectangular water container is fixedly connected with an electric telescopic rod, the output end of the electric telescopic rod is fixedly connected with a horizontal separating plate, and the output end of the motor is fixedly connected with a rotating shaft; the end of the rotating shaft far away from the motor is fixedly connected with a conical table, and the outer surface of that conical table is fixedly connected with metal wires.

Preferably, the front surface of the outer rectangular water container is provided with the first side unpacking door, and the front surface of the outer rectangular water container is provided with the second side unpacking door above the first side unpacking door; the right surface of the outer rectangular water container is provided with a drain outlet, and the first cavity is arranged on the upper surface of the outer rectangular water container and the lower side of the first antirust horizontal separating net; the second cavity is formed between the first antirust horizontal separating net and the second antirust horizontal separating net, the third cavity is formed on the upper surface of the second antirust horizontal separating net, and the lower surface of the hard water spray pipe is fixedly connected with the soft water guide pipe; the number of the water spray round holes is multiple and distributed left and right, and the number of the water pump is multiple and distributed back and forth, and the rear surface of the water pump is provided with a water inlet.

Preferably, the pore size of the first antirust horizontal separating net is smaller than that of the second antirust horizontal separating net, the side surface of the horizontal separating plate is provided with an opening, and the diameter of the opening is the same as the outer diameter of the rotating shaft; the number of the electric telescopic rods is two and distributed left and right, and the number of the metal wires is multiple and distributed annularly.

Preferably, an internal cleaning cavity is formed on the inner surface of the cleaning box, the gap between the cleaning box and the metal wires is smaller than the diameter of *Torreya grandis* 'Merrillii' fruits, and the upper surface of the cleaning box is fixedly connected with an open baffle.

Preferably, the water pump, servo motor, electric telescopic rod and motor are all electrically connected with an external power supply, and the upper surface of the horizontal separating plate is in contact with the lower surface of the cleaning box.

(3) Beneficial Effects

The invention provides the peeling, screening and cleaning device for *Torreya grandis 'Merrillii'*s, which has the following beneficial effects:

According to the peeling, screening and cleaning device for *Torreya grandis 'Merrillii'*s, the pretreated *Torreya grandis 'Merrillii'* pericarp is separated from the inner *Torreya grandis 'Merrillii'*s through the metal wires and conical table, the time for removing the pericarp is adjusted through the electric telescopic rod, and the time for separating the pericarp is controlled; and the outer pericarp can be separated from the *Torreya grandis 'Merrillii'*s through the cooperation of the outer rectangular water container, water pump and hard water spray pipe.

Where 1. outer rectangular water container; 2. the first side unpacking door; 3. the second side unpacking door; 4. the first antirust horizontal separating net; 5. the second antirust horizontal separating net; 6. water pump; 7. servo motor; 8. soft water guide pipe; 9. hard water spray pipe; 10. water spray round hole; 11. the first antirust metal transverse supporting rod; 12. the second antirust metal transverse supporting rod; 13. electric telescopic rod; 14. horizontal separating plate; 15. opening; 16. motor, 17. rotating shaft; 18. conical table; 19. metal wire; 20. cleaning box; 21. open baffle; 22. internal cleaning cavity; 23. drain outlet; 24. the first cavity; 25. the second cavity; 26. the third cavity.

DETAILED DESCRIPTION OF EMBODIMENTS

In the following, the technical scheme in the embodiment of the present invention will be clearly and completely described with reference to the attached figures. Obviously, the described embodiment is only a part of the embodiment of the present invention, but not the whole embodiment. Based on the embodiments in the present invention, all other embodiments obtained by ordinary technicians in the field without creative labor belong to the scope of protection of the present invention.

Figure 1:
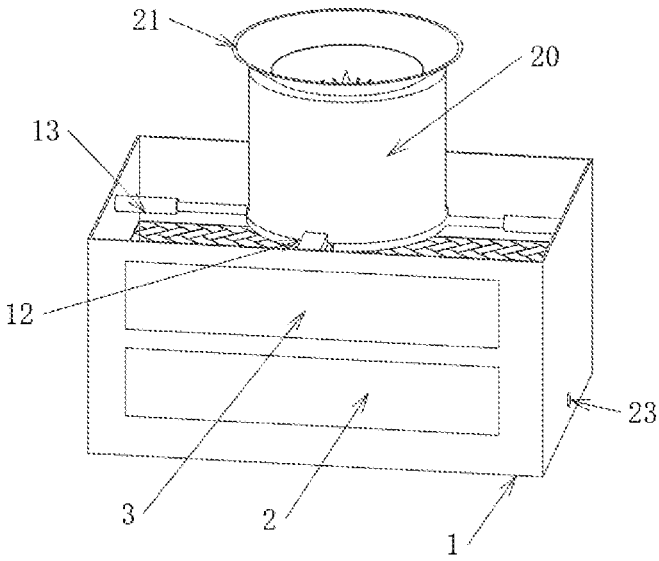
FIG. 1 is a schematic diagram of the overall structure of the present invention.
Figure 2:
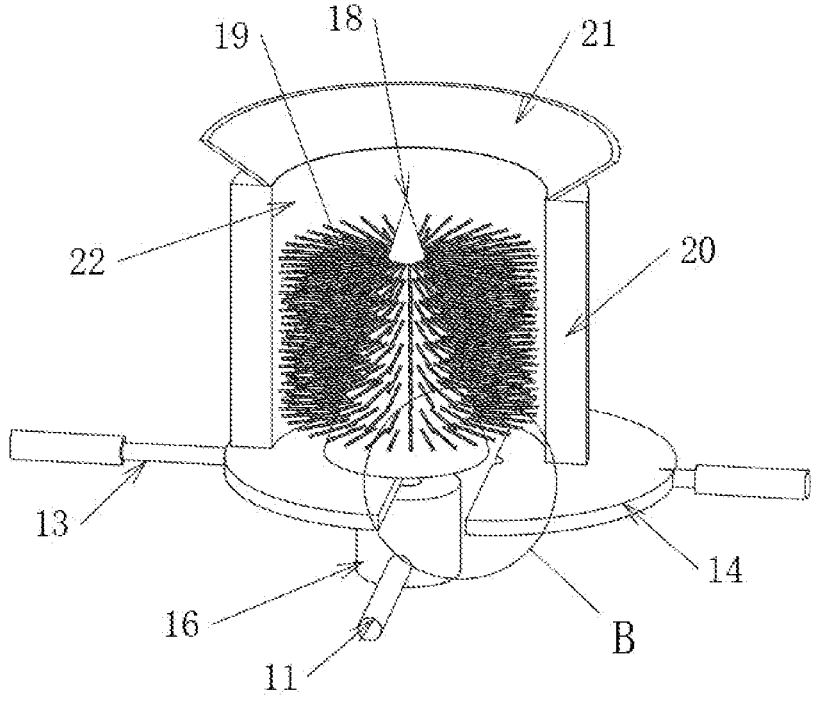
FIG. 2 is a schematic diagram of the internal structure of the present invention.
Figure 3:
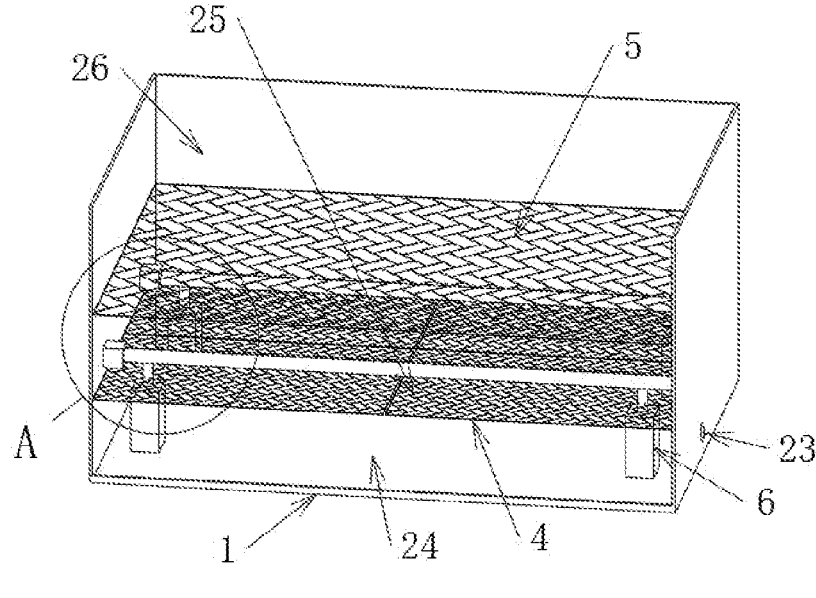
FIG. 3 is a schematic diagram of the overall structure of the present invention.
Figure 4:
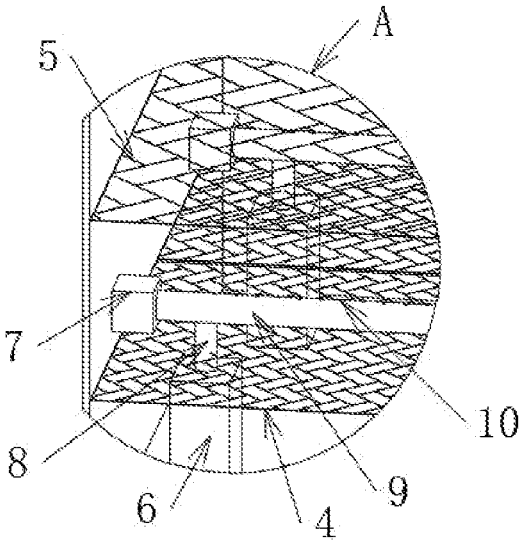
FIG. 4 is an enlarged schematic view of the structure at A in FIG. 3.
Figure 5:
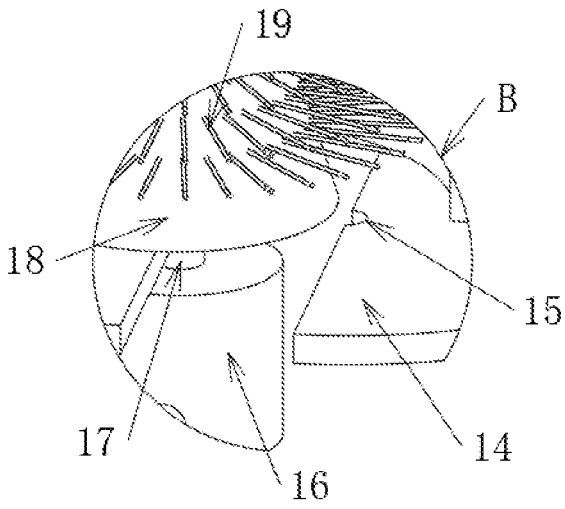
FIG. 5 is an enlarged schematic view of the structure at B in FIG. 2.

As shown in FIGS. 1-5, the embodiment of the invention provides a peeling, screening and cleaning device for *Torreya grandis 'Merrillii'*s, which comprises an outer rectangular water container 1. The front surface of the outer rectangular water container 1 is provided with the first side unpacking door 2, and the front surface of the outer rectangular water container 1 is provided with the second side unpacking door 3 above the first side unpacking door 2. The right surface of the outer rectangular water container 1 is provided with a drain outlet 23 for draining water, and the first cavity 24 is arranged on the upper surface of the outer rectangular water container 1 and the lower side of the first antirust horizontal separating net 4. The second cavity 25 is formed between the first antirust horizontal separating net 4 and the second antirust horizontal separating net 5. The pore size of the first antirust horizontal separating net 4 is smaller than that of the second antirust horizontal separating net 5, the side surface of the horizontal separating plate 14 is provided with an opening 15, and the diameter of the opening 15 is the same as the outer diameter of the rotating shaft 17. The number of the electric telescopic rods 13 is two and distributed left and right, and the number of the metal wires 19 is multiple and distributed annularly. The third cavity 26 is formed on the upper surface of the second antirust horizontal separating net 5, and the lower surface of the hard water spray pipe 9 is fixedly connected with the soft water guide pipe 8; the number of the water spray round holes 10 is multiple and distributed left and right, and the number of the water pump 6 is multiple and distributed back and forth. The water pump 6, servo motor 7, electric telescopic rod 13 and motor 16 are all electrically connected with an external power supply, the upper surface of the horizontal separating plate 14 is in contact with the lower surface of the cleaning box 20, and the rear surface of the water pump 6 is provided with a water inlet. An outer rectangular water container 1, the inner surface of the outer rectangular water container 1 is fixedly connected with the first antirust horizontal separating net 4 for separating broken pericarp, the inner surface of the outer rectangular water container 1 is fixedly connected with the second antirust horizontal separating net 5 for separating water from broken pericarp, and the bottom inner wall of the outer rectangular water container 1 is fixedly connected with a water pump 6. The output end of the water pump 6 is fixedly connected with a soft water guide pipe 8, the inner surface of the outer rectangular water container 1 is fixedly connected with a servo motor 7, the output end of the servo motor 7 is fixedly connected with a hard water spray pipe 9, and the upper surface of the hard water spray pipe 9 is provided with a water spray round hole 10.

The inner surface of the outer rectangular water container 1 is fixedly connected with the second antirust metal transverse supporting rod 12, and the inner surface of the outer rectangular water container 1 is fixedly connected with the first antirust metal transverse supporting rod 11. One end of the first antirust metal transverse supporting rod 11 far away from the outer rectangular water container 1 is fixedly connected with a motor 16 for driving the metal wires 19 to rotate. One end of the second antirust metal transverse supporting rod 12 far from the outer rectangular water container 1 is fixedly connected with a cleaning box 20. An internal cleaning cavity 22 is formed on the inner surface of the cleaning box 20, the gap between the cleaning box 20 and the metal wires 19 is smaller than the diameter of *Torreya grandis 'Merrillii'* fruits, and the upper surface of the cleaning box 20 is fixedly connected with an open baffle 21. The inner surface of the outer rectangular water container 1 is fixedly connected with an electric telescopic rod 13, the output end of the electric telescopic rod 13 is fixedly connected with a horizontal separating plate 14, and the output end of the motor 16 is fixedly connected with a rotating shaft 17. The end of the rotating shaft 17 far away from the motor 16 is fixedly connected with a conical table 18, and the outer surface of that conical table 18 is fixedly connected with metal wires 19 for crushing *Torreya grandis 'Merrillii'*s.

Working principle: *Torreya grandis 'Merrillii'* seeds which have been pretreated by steaming, boiling, freezing, drying and shell breaking are placed in the cleaning box 20 through the open baffle 21, and the motor 16 is turned on, and the motor 16 drives the conical table 18 to rotate, and the mental wires 19 are driven to rotate through the conical table 18. During the rotation, *Torreya grandis 'Merrillii'* is peeled by the metal wires 19, and the position of the horizontal separating plate 14 is adjusted by the electric telescopic rod 13, so that the cleaning time can be adjusted. When the electric telescopic rod 13 is opened, *Torreya grandis 'Merrillii'*'s and pericarp can be dropped to the upper side of the second antirust horizontal separating net 5, and smaller pericarp can be dropped into the first antirust horizontal separating net 4 by spraying water.

Although embodiments of the present invention have been shown and described, it will be understood by those skilled in the field that various changes, modifications, substitutions and variations can be made to these embodiments without departing from the principles and spirit of the present invention, the scope of the present invention is defined by the appended claims and their equivalents.

What is claimed is:

1. A peeling, screening and cleaning device for *Torreya grandis 'Merrillii'*'s, comprising:
an outer rectangular water container (1), wherein an inner surface of the outer rectangular water container (1) is fixedly connected with a first antirust horizontal separating net (4), the inner surface of the outer rectangular water container (1) is fixedly connected with a second antirust horizontal separating net (5), and a bottom inner wall of the outer rectangular water container (1) is fixedly connected with a water pump (6); an output end of the water pump (6) is fixedly connected with a soft water guide pipe (8), the inner surface of the outer rectangular water container (1) is fixedly connected with a servo motor (7), an output end of the servo motor (7) is fixedly connected with a hard water spray pipe (9), and an upper surface of the hard water spray pipe (9) is provided with a water spray round hole (10); and
wherein the inner surface of the outer rectangular water container (1) is fixedly connected with second antirust metal transverse supporting rod (12), and the inner surface of the outer rectangular water container (1) is fixedly connected with a first antirust metal transverse supporting rod (11); one end of the first antirust metal transverse supporting rod (11) facing away from the outer rectangular water container (1) is fixedly connected with a motor (16); one end of the second antirust metal transverse supporting rod (12) facing away from the outer rectangular water container (1) is fixedly connected with a cleaning box (20); the inner surface of the outer rectangular water container (1) is fixedly connected with an electric telescopic rod (13), an output end of the electric telescopic rod (13) is fixedly connected with a horizontal separating plate (14), and an output end of the motor (16) is fixedly connected with a rotating shaft (17); an end of the rotating shaft (17) facing away from the motor (16) is fixedly connected with a conical table (18), and an outer surface of that conical table (18) is fixedly connected with metal wires (19).

2. The peeling, screening and cleaning device for *Torreya grandis 'Merrillii'*'s as claimed in claim 1, wherein, a front surface of the outer rectangular water container (1) is provided with L first side unpacking door (2), and the front surface of the outer rectangular water container (1) is provided with a second side unpacking door (3) above the first side unpacking door (2); a side surface of the outer rectangular water container (1) is provided with a drain outlet (23), and a first cavity (24) is arranged on an upper surface of the outer rectangular water container (1) and a lower side of the first antirust horizontal separating net (4); a second cavity (25) is formed between the first antirust horizontal separating net (4) and the second antirust horizontal separating net (5), a third cavity (26) is formed on an upper surface of the second antirust horizontal separating net (5), and a lower surface of the hard water spray pipe (9) is fixedly connected with the soft water guide pipe (8); the water spray round holes (10) is multiple in number and distributed on the hard water spray pipe (9) from an end to another end thereof, the water pump (6) is multiple in number, and a rear surface of each water pump (6) is provided with a water inlet.

3. The peeling, screening and cleaning device for *Torreya grandis 'Merrillii'*'s as claimed in claim 1, wherein, a pore size of the first antirust horizontal separating net (4) is smaller than that of the second antirust horizontal separating net (5), a side surface of the horizontal separating plate (14) is provided with an opening (15), and a diameter of the opening (15) is the same as an outer diameter of the rotating shaft (17); the electric telescopic rods (13) is two in number and distributed at two sides of the horizontal separating plate (14), and the metal wires are distributed annularly around the conical table (18).

4. The peeling, screening and cleaning device for *Torreya grandis 'Merrillii'*'s as claimed in claim 1, wherein, an internal cleaning cavity (22) is formed on an inner surface of the cleaning box (20), a gap between the cleaning box (20) and the metal wires (19) is smaller than a diameter of *Torreya grandis 'Merrillii'* fruits, and an upper surface of the cleaning box (20) is fixedly connected with an open baffle (21).

5. The peeling, screening and cleaning device for *Torreya grandis 'Merrillii'*'s as claimed in claim 1, wherein, the water pump (6), the servo motor (7), the electric telescopic rod (13) and the motor (16) are all electrically connected with an external power supply, and an upper surface of the horizontal separating plate (14) is in contact with a lower surface of the cleaning box (20).

* * * * *